United States Patent
Buchheit et al.

(10) Patent No.: US 7,703,673 B2
(45) Date of Patent: Apr. 27, 2010

(54) WEB BASED CONVERSION OF NON-NEGOTIABLE CREDITS ASSOCIATED WITH AN ENTITY TO ENTITY INDEPENDENT NEGOTIABLE FUNDS

(76) Inventors: Brian K. Buchheit, 15521 SW. 49th St., Davie, FL (US) 33331; Sean I. McGhie, 3480 Pine Haven Dr., Boca Raton, FL (US) 33431

( * ) Notice: Subject to any disclaimer, the term of this patent is extended or adjusted under 35 U.S.C. 154(b) by 994 days.

(21) Appl. No.: 11/420,255

(22) Filed: May 25, 2006

(65) Prior Publication Data

US 2008/0040270 A1    Feb. 14, 2008

(51) Int. Cl.
*G06K 5/00* (2006.01)
(52) U.S. Cl. ............... 235/380; 235/375; 235/379; 235/487
(58) Field of Classification Search .......... 235/380, 235/375, 379, 487, 486; 705/14, 39
See application file for complete search history.

(56) References Cited

U.S. PATENT DOCUMENTS 6,311,976 B1 * 11/2001 Yoseloff et al. ......... 273/138.2
6,685,559 B2 * 2/2004 Luciano et al. ............ 463/16
7,200,571 B1 * 4/2007 Jenniges et al. ............ 705/37
2001/0054003 A1 * 12/2001 Chien et al. ............... 705/14

* cited by examiner

Primary Examiner—Edwyn Labaze
(74) Attorney, Agent, or Firm—Patents on Demand, P.A.; Brian K. Buchheit

(57) ABSTRACT

A method for converting credits to funds can include a step of a Web site receiving user identification information. Non-negotiable credits can be identified that are associated with an entity with which the user has previously interacted. The previous interactions could have earned the non-negotiable credits. Responsive to a user request, a conversion agency can convert a quantity of the non-negotiable credits into a quantity of negotiable funds. The conversion agency can be an agency not directly associated with the entity. The user can be permitted to access the quantity of negotiable funds. The quantity of negotiable funds can be applied to user specified purchases. At least a portion of the purchases can involve at least one vender that does not honor the non-negotiable credits.

18 Claims, 3 Drawing Sheets

WEB BASED CONVERSION OF NON-NEGOTIABLE CREDITS ASSOCIATED WITH AN ENTITY TO ENTITY INDEPENDENT NEGOTIABLE FUNDS

BACKGROUND

1. Field of the Invention

The present invention relates to the field of e-commerce and, more particularly, to the automatic conversion of non-negotiable credits associated with entities to negotiable foods independent of the entities.

2. Description of the Related Art

Entities often reward consumers for utilizing their services with non-negotiable credits, such as frequent flier miles, consumer loyalty points, and entertainment credits. These non-negotiable credits can be applied towards products and/or services provided by a granting entity or its affiliates. For example, consumers can apply frequent flyer credits towards the purchase of airline tickets or airline upgrades. In another example, a consumer can utilize purchase points from a credit card company to receive percentage discounts on goods provided by affiliates. In still another example, entertainment credits can be redeemed for prizes offered in a winnings storefront of an entertainment site.

Many problems are inherent to the current techniques for the redemption of entity provided credits. One such problem is the restriction on usage to goods and/or services of the entity. That is, a consumer may have no need for the products or services listed by the entity for which the non-negotiable credits can be redeemed. Further, additional restrictions and limitations can be placed upon the non-negotiable credits that lessen the usefulness of non-negotiable credits from the consumer's perspective. For instance, airlines often limit the choice of travel dates, known as black-out dates, to which frequent flyer credits can be applied.

Another problem encountered by consumers when redeeming non-negotiable credits is time. Once a consumer submits a request to redeem their non-negotiable credits, the consumer must wait for the entity to perform one or more actions required to fulfill their request. These steps often require days or weeks to complete. For instance, consumers participating in online entertainment sites often are required to wait a minimum of three days for their entertainment credits to be redeemed. Redemption delay can be particularly aggravating to e-commerce consumers, who by nature of an e-commerce marketplace expect rapid responses and immediate consumer gratification.

Time can also be a factor for redeeming credits having an associated expiration date. A consumer's non-negotiable credits may expire before a sufficient quantity is acquired for a desired purchase. Lesser purchases requiring fewer credits may not have a significant appeal for the consumer. Hence, credit expiration dates can further decrease the consumer value of non-negotiable credits.

Yet another problem with conventional implementation of non-negotiable credits is that consumers often belong to multiple credit-earning programs that provide the consumers with multiple incompatible forms of non-negotiable credit. Each of these multiple programs can span a single industry or can span multiple industries. For example, a consumer can acquire a moderate number of frequent flyer miles with multiple airlines, where each airline specific account contains insufficient credits to have any meaningful consumer value. Consumers can also have many different types of non-negotiable credits, such as multiple merchant specific credit, credit card credits, and frequent flier miles, each having different redemption values and program redemption rules. These different programs, values, and rules can understandably confuse and frustrate consumers, who due to their confusion, often elect to avoid participating in an entity sponsored credit program.

SUMMARY OF THE INVENTION

The present invention permits consumers to transform non-negotiable credits provided by an entity to negotiable funds in an approximate immediate fashion using the Web. More specifically, a conversion agency can function as an intermediary that converts entity provided credits into entity independent funds. The conversion agency can be an independent entity that is not directly affiliated with the credit providing entities.

The conversion can occur automatically using a Web initiated action and can have approximately immediate results. Approximately immediate as used herein can signify that a transaction can occur within a single Web session with user acceptable delay tolerances, typically under half an hour and often under a few minutes. In one embodiment, credits can be automatically converted to funds as part of an e-commerce checkout. In another embodiment, credits can be converted into a user accessible account held with a financial institution.

The present invention can be implemented in accordance with numerous aspects consistent with material presented herein. For example, one aspect of the present invention can include a method for converting credits to funds. The method can include a step of a Web site receiving user identification information. Non-negotiable credits can be identified that are associated with an entity with which the user has previously interacted. The previous interactions could have earned the non-negotiable credits. Responsive to a user request, a conversion agency can convert a quantity of the non-negotiable credits into a quantity of negotiable funds. The conversion agency can be an agency not directly associated with the entity. The user can be permitted to access the quantity of negotiable funds. The quantity of negotiable funds can be applied to user specified purchases. At least a portion of the purchases can involve at least one vender that does not honor the non-negotiable credits.

Another aspect of the present invention can include a software method for convertins non-negotiable credits into negotiable funds. The method can receive a user request to convert a quantity of non-negotiable credits held in a user account associated with an entity. A conversion rate between the non-negotiable credits available to the user and a form of negotiable funds can be automatically determined. A quantity of non-negotiable credits can be automatically subtracted from the user account. A quantity of the negotiable funds based upon the determined conversion rate and quantity of subtracted funds can be automatically transferred to a financial account. The financial account can be an account that is not associated with the entity. The entire method can occur in an approximately immediate fashion.

Still another aspect of the present invention can include a Web-based credit to fund conversion system. The system can include a non-negotiable credit account, a negotiable funds account, and a conversion agency. The non-negotiable credit account can be associated with an entity. Non-negotiable credits contained within the non-negotiable credit account can be earned though previously interactions between a user and the entity. The negotiable funds account can include negotiable funds that the user is able to apply to user specified e-commerce purchases. One or more venders involved in the e-commerce purchases can be venders that do not honor the non-negotiable credits for the e-commerce purchases. The conversion agency can automatically and approximately immediately convert a quantity of credits from the non-negotiable credit account to a quantity of funds in the negotiable funds account responsive to a request from the user.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
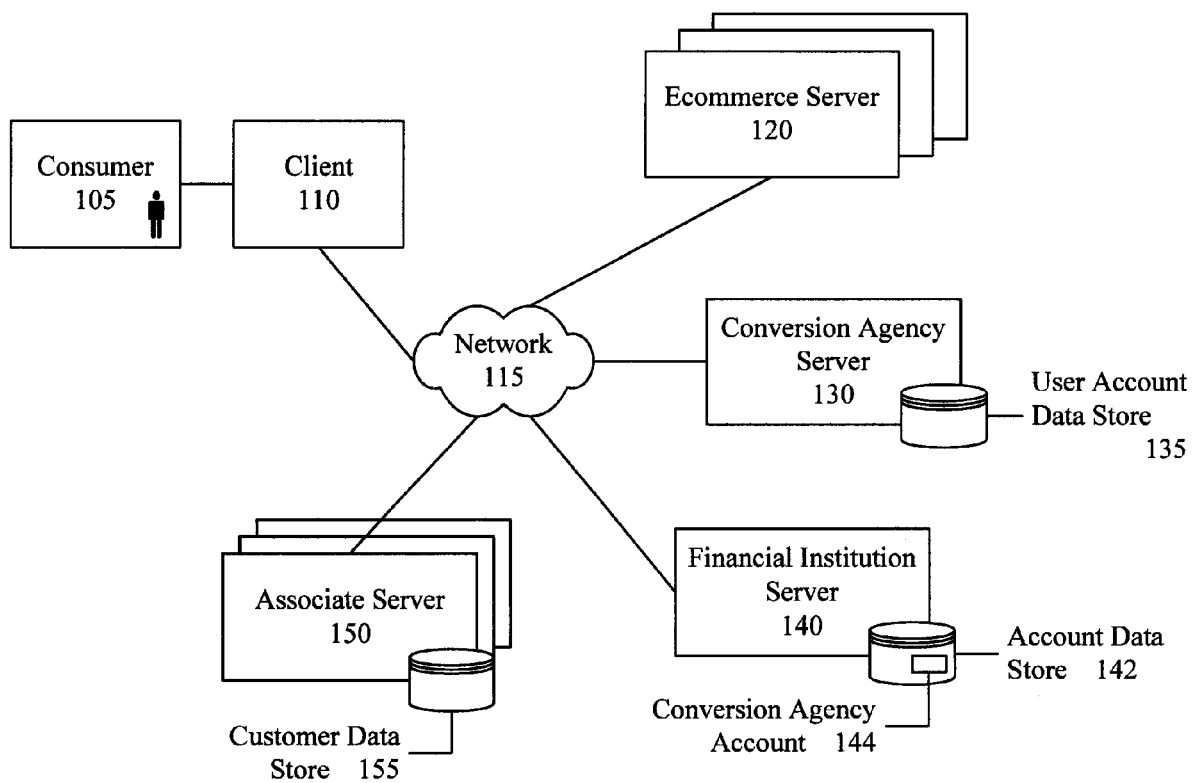
FIG. 1 is a schematic diagram of a Web based conversion of non-negotiable credits associated with an entity to entity independent funds system in accordance with an embodiment of the inventive arrangements disclosed herein.

FIG. 1 is a schematic diagram of a Web based conversion of non-negotiable credits associated with an entity to entity independent funds system 100 in accordance with an embodiment of the inventive arrangements disclosed herein. System 100 includes consumer 105 and conversion agency server 130.

Consumer 105 interacts with conversion agency server 130 via client 110. Client 110 can be any of a variety of interfaces including, but not limited to, another human being, a personal computer, a kiosk, a graphical user interface (GUI), a Web page, a telephone, a personal data assistant (PDA), a mobile phone, and the like.

Client 110 can operate in a stand-alone fashion. Alternatively, client 110 can be a device that cooperatively participates in a network of distributed computing devices. Client 110 can also be another human being utilizing an alternate form of Client 110 to access conversion agency server 130 via network 115. Network 115 can facilitate data exchanges over wireless as well as line-based communication pathways and protocols.

Both consumer 105 and conversion agency server 130 can interact with associate server 150, e-commerce server 120, and financial institution server 140 via network 115. Conversion agency server 130 includes user account data store 135 in which consumer 105 is a member. Associate server 150 includes customer data store 155 in which consumer 105 is a member. Financial institution server 140 includes account data store 142. Account data store 142 includes conversion agency account 144 corresponding to conversion agency 130.

Consumer 105 earns non-negotiable credits from associate server 150. The quantity of these non-negotiable credits is saved in customer data store 155. The method in which consumer 105 earns credits can be any of a variety of activities including, but not limited to, making online purchases, making in-store purchases, playing online games, participating in online games of chance, participating in surveys, and the like. Consumer 105 uses conversion agency server 130 to convert the non-negotiable credits from associate server 150 into negotiable funds provided by e-commerce server 120 or financial institution 140. In one embodiment, conversion agency 130 can include multiple reward accounts of consumer 105.

For example, consumer 105 earns 500 credits from participating in an online game of chance hosted by associate server 150. Consumer 105 can choose to use conversion agency 130 to convert any or all of these credits to a monetary equivalent. Conversion agency 130 withdraws the necessary amount from conversion agency account 144 contained within the account data store 142 of financial institution 140 and transfers it to an account specified by consumer 105. In another example, consumer 105 uses conversion agency 130 to complete a purchase at e-commerce server 120. Again, conversion agency 130 withdraws the necessary amount from conversion agency account 144 contained within the account data store 142 of financial institution 140 and transfers it to the account of e-commerce server 120.

E-commerce server 120 can be any Web site that supports online purchases of goods or services. In one embodiment, e-commerce server 120 can include a distinct payment option for conversion agency 130. This distinct payment option could process the conversion of credits through their Web site. Alternatively, the distinct payment option could launch an application to process the conversion of credit that is separate from their Web site. In another embodiment, associate server 150 can act as e-commerce server 120.

Financial institution server 140 can be any of a variety of entities including, but not limited to, a bank, a credit card company, an investment firm, and the like. In one embodiment, financial institution server 140 can reside in the same country as consumer 105 and/or associate server 150. In another embodiment, financial institution server 140 can reside in a country other than that of consumer 105 and/or associate server 150.

Figure 2:
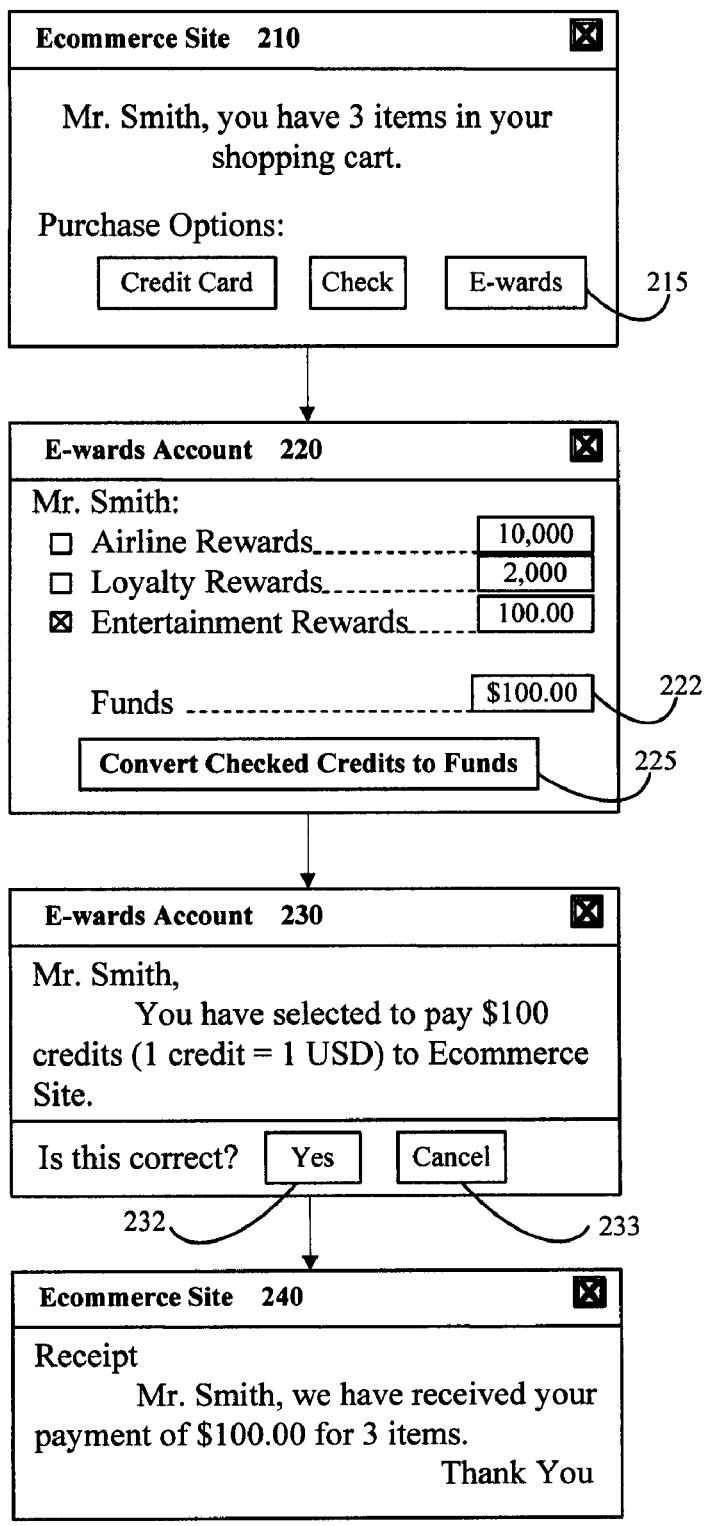
FIG. 2 is a schematic diagram of successive GUIs that illustrate the Web based conversion of non-negotiable credits associated with an entity to entity independent funds system in accordance with an embodiment of the inventive arrangements disclosed herein.

FIG. 2 is a schematic diagram of successive GUIs that illustrate the Web based conversion of non-negotiable credits associated with an entity to entity independent funds system 200 in accordance with an embodiment of the inventive arrangements disclosed herein.

GUI 210 can be a checkout window from any e-commerce site. GUI 210 includes payment button 215. Payment button 215 can represent a payment option that includes the conversion of non-negotiable credits to purchase the items in the shopping cart. Selection of payment button 215 by a user can produce GUI 220.

GUI 220 can be a display window from a conversion agency. GUI 220 includes display box 222 and button 225. GUI 220 can be rendered by any of a variety of means including, but not limited to, a Web browser, a JAVA applet, a PERL script, and the like. In one embodiment, GUI 220 can be contained within the e-commerce site. GUI 220 can display the balance of non-negotiable credits from one or more reward programs. GUI 220 contains a means by which the user selects the type of non-negotiable credits to convert including, but not limited to, a set of radio buttons, a set of checkboxes, a highlighting mechanism, and the like. Display box 222 can display the monetary value of the selected non-negotiable credits. The value displayed in display box 222 can be based on preset conversion factors. Button 225 can represent the initiation of the process by which the selected non-negotiable credits are convened to negotiable funds. Selection of button 225 by a user can produce GUI 230.

GUI 230 can be a display window from a conversion agency. GUI 230 includes yes button 232 and cancel button 233. GUI 230 can be rendered by any of a variety of means including, but not limited to, a Web browser, a JAVA applet, a PERL script, and the like. In one embodiment, GUI 230 can be contained within the e-commerce site. GUI 230 can display a summary message of the transaction initiated by GUI 220. GUI 230 can include a means to continue the transaction, yes button 232, and a means to cancel the transaction, cancel button 233. Selection of cancel button 233 by a user cancels the transaction and can return the user to GUI 220. Selection of yes button 232 by a user completes the transaction initiated in GUI 220 and can produce GUI 240.

GUI 240 can be a display window from the same said e-commerce site. GUI 240 can contain a message acknowledging the successful conversion of the user's non-negotiable credits into negotiable funds for the purchase of the items in the shopping cart.

Figure 3:
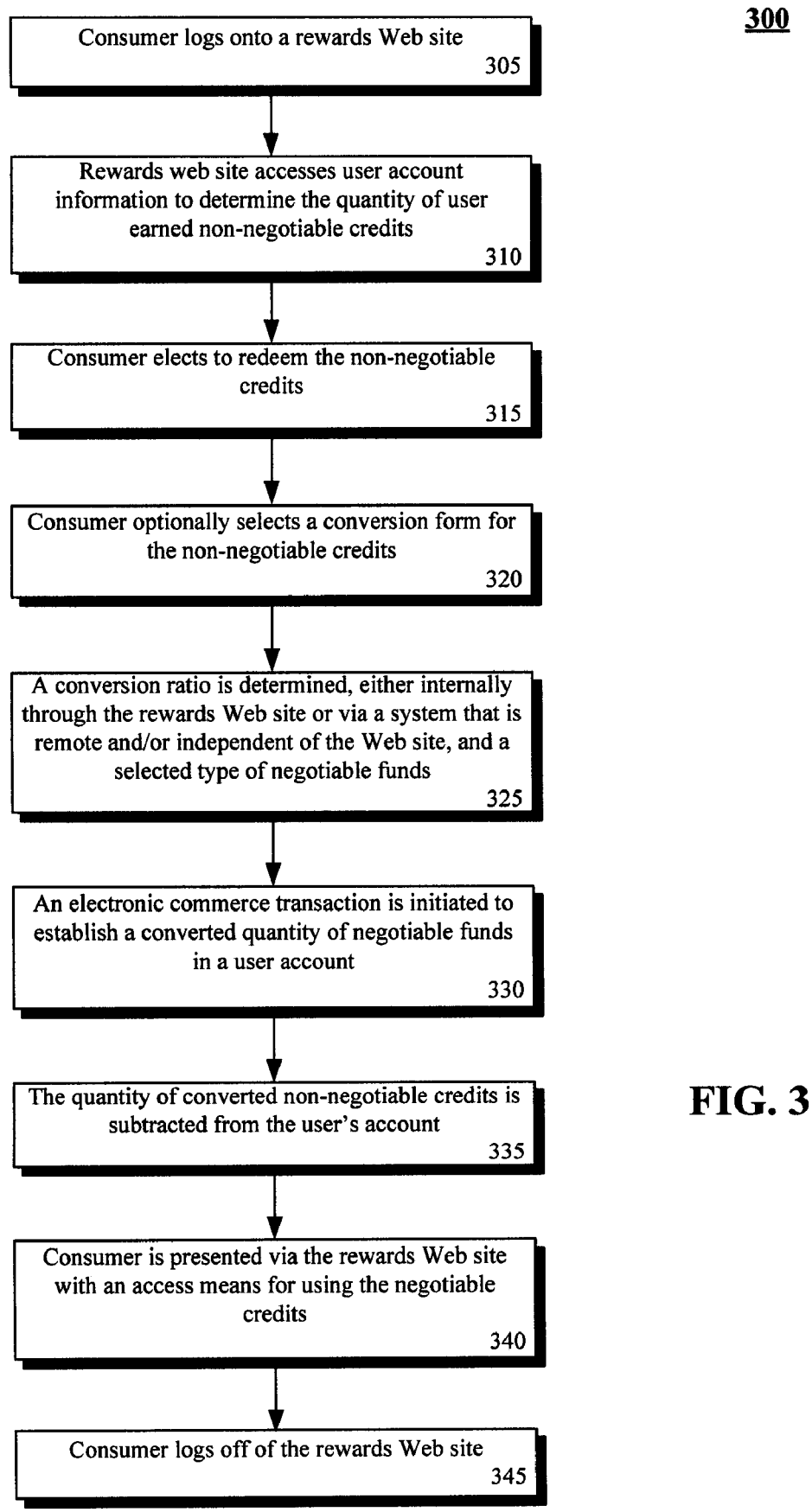
FIG. 3 is a flow chart of a method for the Web based conversion of non-negotiable credits associated with an entity to entity independent funds system in accordance with an embodiment of the inventive arrangements disclosed herein.

FIG. 3 is a flow chart of a method 300 for the Web based conversion of non-negotiable credits associated with an entity to entity independent funds system in accordance with an embodiment of the inventive arrangements disclosed herein.

Method 300 can begin in step 305, where a consumer logs onto a rewards Web site. In step 310, the rewards Web site utilizes the user information provided in step 305 to access the consumer's account information and display the amount of non-negotiable credits in the consumer's account. The consumer elects to redeem some quantity of non-negotiable credits in step 315. If supported by the rewards Web site, step 320 can occur in which the consumer can select the form of negotiable funds to convert the non-negotiable credits. In step 325, a ratio is determined for the conversion of the non-negotiable credits to the selected type of negotiable funds. This ratio can be determined by any of a variety of means including, but not limited to, an algorithm internal to the rewards Web site, an algorithm contained in a system that is remote and/or independent of the rewards Web site, and the like. An electronic commerce transaction is initiated in step 330 to establish the converted amount of negotiable funds in a user account. The quantity of convened non-negotiable credits is subtracted from the user's account in step 335. In step 340, the rewards Web site presents the consumer with an access means for the negotiable funds. Lastly, the consumer terminates the session by logging off the rewards Web site in step 345.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for converting credits to funds comprising:
   a Web site receiving user identification information;
   identifying entertainment credits from a game of chance associated with an entity with which said user has previously interacted, the previous interactions earning the entertainment credits, which are non-negotiable credits;
   responsive to a user request, a conversion agency converting a quantity of the entertainment credits to a quantity of negotiable funds, wherein the conversion agency is not directly associated with the entity; and
   permitting the user to access the quantity of negotiable funds, wherein the quantity of negotiable funds are able to be applied to user specified purchases, wherein at least a portion of said purchases involve at least one vender that does not honor the non-negotiable, entertainment credits.

2. The method of claim 1, wherein the converting and permitting steps occur in an approximately immediate fashion.

3. The method of claim 2, wherein the user specified purchase is an e-commerce purchase, wherein the vender is an e-commerce vender, and wherein the e-commerce vender does not honor the entertainment credits, said method further comprising:
   applying at least a portion of the quantity of negotiable funds to the e-commerce purchase.

4. The method of claim 3, wherein a Web site of the e-commerce vender includes a distinctive user selectable payment option for obtaining funds from the conversion agency, wherein the entertainment credits are winnings from said game of chance.

5. The method of claim 1, wherein the converting step utilizes a Web service.

6. The method of claim 1, further comprising:
   the conversion agency providing at least a portion of the negotiable funds to the vender; and
   the vender compensating the conversion agency for the negotiable funds of the providing step.

7. The method of claim 1, further comprising:
   the conversion agency automatically and approximately immediately adding the quantity of negotiable funds to a user designated account associated with a financial institution.

8. The method of claim 1, further comprising:
   the conversion agency automatically and approximately immediately adding the quantity of negotiable funds to a prepaid credit card account accessible by the user.

9. The method of claim 1, further comprising:
- identifying different non-negotiable credits associated with a second entity with which said user has previously interacted, the previous interactions earning the different non-negotiable credits;
- the conversion agency converting a quantity of the different non-negotiable credits to a second quantity of negotiable funds, wherein the conversion source and the entity are not directly associated with the second entity; and
- adding the second quantity of negotiable funds to the quantity of negotiable funds from claim 1, whereby the quantity of user accessible negotiable funds is the sum of the funds converted from credits of the two entities.

10. The method of claim 1, wherein the non-negotiable credits comprise gambling credits earned through a gambling Web site.

11. The method of claim 10, further comprising:
- the conversion agency transferring the quantity of negotiable funds into a financial institution account outside borders of a country in which the user resides.

12. The method of claim 11, further comprising:
- the conversion agency transferring a quantity of negotiable funds from the financial institution account to a user designated account established with a financial institution inside the geographical borders of the country in which the user resides.

13. The method of claim 11, further comprising:
- applying funds from the financial institution account to an account of said at least one vender responsive to a user purchase involving said vender, wherein the converting, transferring, and applying steps occur in an approximately immediate fashion.

14. The method of claim 10, further comprising:
- the conversion entity transferring the quantity of negotiable funds into a financial institution account outside geographical borders of a country in which the entity conducts business.

15. The method of claim 1, wherein said steps of claim 1 are performed by at least one machine in accordance with at least one computer program having a plurality of code sections that are executable by the at least one machine.

16. The method of claim 1, wherein the steps of claim 1 are performed by at least one of a service agent and a computing device manipulated by the service agent, the steps being performed in response to a service request.

17. A software method for converting non-negotiable credits into negotiable funds comprising:
- receiving a user request to convert a quantity of gambling credits earned by playing a game of chance held in a user account associated with an entity, said gambling credits being non-negotiable credits;
- automatically determining a conversion rate between the gambling credits available to the user and a form of negotiable funds;
- automatically subtracting a quantity of gambling credits from the user account; and
- automatically transferring a quantity of the negotiable funds based upon the determining step to a financial account, wherein the financial account is not associated with the entity, wherein the receiving, determining, subtracting, and transferring steps occur in an approximately immediate fashion.

18. A Web-based credit to fund conversion system comprising:
- a non-negotiable credit account associated with at least one entity, wherein entertainment credits earned from playing a game of chance are contained within the non-negotiable credit account and are earned though previous interactions between a user and the entity;
- a negotiable funds account including negotiable funds that the user is able to apply to user specified e-commerce purchases, wherein venders involved in the e-commerce purchases do not honor the entertainment credits for the e-commerce purchases; and
- a conversion agency configured to automatically and approximately immediately convert a quantity of entertainment credits from the non-negotiable credit account to a quantity of funds in the negotiable funds account responsive to a request from the user.

* * * * *

UNITED STATES PATENT AND TRADEMARK OFFICE
CERTIFICATE OF CORRECTION

| | | |
|---|---|---|
| PATENT NO. | : 7,703,673 B2 | Page 1 of 1 |
| APPLICATION NO. | : 11/420255 | |
| DATED | : April 27, 2010 | |
| INVENTOR(S) | : Brian K. Buchheit and Sean I. McGhie | |

It is certified that error appears in the above-identified patent and that said Letters Patent is hereby corrected as shown below:

Column 1, line 11, the word "foods" should read --funds--.

Column 2, line 10, the word "approximate" should read --approximately--; line 43, the word "convertins" should read --converting--; line 62, the word "previously" should read --previous--.

Column 4, line 20, the number "500" should be replaced with the words --five hundred--.

Column 5, line 10 and line 51, each occurrence of the word "convened" should read --converted--.

Column 6:
claim 1, line 22, after "a Web site" to and ending with "identification information" add --for a user--;
claim 1, line 25, the words "the previous interactions earning" should read --wherein previous interactions with the entity earn--;
claim 6, line 56 and line 57, each occurrence of the words "the vender" should read --the at least one vender--.

Column 7:
claim 9, line 8, the words "conversion source" should read --conversion agency--;
claim 9, line 11, the words "whereby the" should read --whereby a--;
claim 13, line 30, the words "said vender" should read --said at least one vender--;
claim 14, line 34, the word "entity" should read --agency--;
claim 15, line 38, the words "said steps" should read --the steps--.

Column 8:
claim 18, line 27, the word "though" should read --through--;
claim 18, line 28, the words "the entity" should read --the at least one entity--.

Signed and Sealed this
Fifth Day of June, 2012

David J. Kappos
*Director of the United States Patent and Trademark Office*